United States Patent [19]
Lee

[11] Patent Number: 5,872,854
[45] Date of Patent: Feb. 16, 1999

[54] DEVICE AND METHOD FOR MULTI-PROCESSING EVR ADJUSTMENT

[75] Inventor: Byung Hee Lee, Kyungki-do, Rep. of Korea

[73] Assignee: Goldstar Co., Ltd., Rep. of Korea

[21] Appl. No.: 696,102

[22] Filed: Aug. 14, 1996

Related U.S. Application Data

[63] Continuation of Ser. No. 264,711, Jun. 23, 1994, abandoned.

[30] Foreign Application Priority Data

Jun. 26, 1993 [KR] Rep. of Korea .................. 11773/1993

[51] Int. Cl.$^6$ ...................................................... H04B 1/00
[52] U.S. Cl. ........................... 381/109; 381/119; 381/104
[58] Field of Search ................................. 381/119, 104, 381/109; 84/345

[56] References Cited

U.S. PATENT DOCUMENTS

| | | | |
|---|---|---|---|
| 4,306,113 | 12/1981 | Morton | 381/103 |
| 4,375,776 | 3/1983 | Okamoto et al. | 84/345 |
| 4,614,144 | 9/1986 | Sagara et al. | 84/462 |
| 5,402,501 | 3/1995 | Silfajt et al. | 381/119 |

OTHER PUBLICATIONS

Chamberlin, Musical Applications of Microprocessors, pp. 239–243, 268–269, 1980.

Primary Examiner—Forester W. Isen
Attorney, Agent, or Firm—Fish & Richardson PC

[57] ABSTRACT

This invention relates to a device and method for multi-processing EVR adjustment where in an electric volume register adjustment device includes: a plurality of operation mode means having exclusive adjustment conditions from each other, a plurality of switches causing adjustment for the plurality of operation mode means, a control means for controlling system according to the operation of the plurality of switches, an adjustment voltage application means for applying voltage required for an adjustment to the plurality of operation mode means according to the control of the control means, and, a memory for storing the adjustment data which will be applied to the plurality of operation mode means according to the control of the control means and a method for multi-processing electric volume register adjustment includes steps of adjustment operation mode selection for selecting one operation mode from a plurality of operation modes having exclusive adjustment conditions from each other in an adjustment mode adjustment finish volume storage for storing adjustment finish values after selecting to-be-adjusted part on which the adjustment of the operation mode selected in the step of the adjustment operation mode is to be executed and executing adjustment of the operation mode thereon; and, an adjustment finish value application for applying the stored adjustment finish value to the to-be-adjusted part on which the desired operation mode of the plurality of modes having exclusive adjustment conditions from each other if executed in normal mode, will be executed.

7 Claims, 7 Drawing Sheets

DEVICE AND METHOD FOR MULTI-PROCESSING EVR ADJUSTMENT

This is a continuation of U.S. application Ser. No. 08/264,711 filed Jun. 23, 1994, now abandonded.

FIELD OF THE INVENTION

This invention rlates to a device and method for multi-processing EVR(Electric Volume Register) adjustment used for video cassette recorders, audios, televisions, laserdiskplayers, compact disk interactives, air conditioners, and telephones etc.,

BACKGROUND OF THE INVENTION

Figure 1:
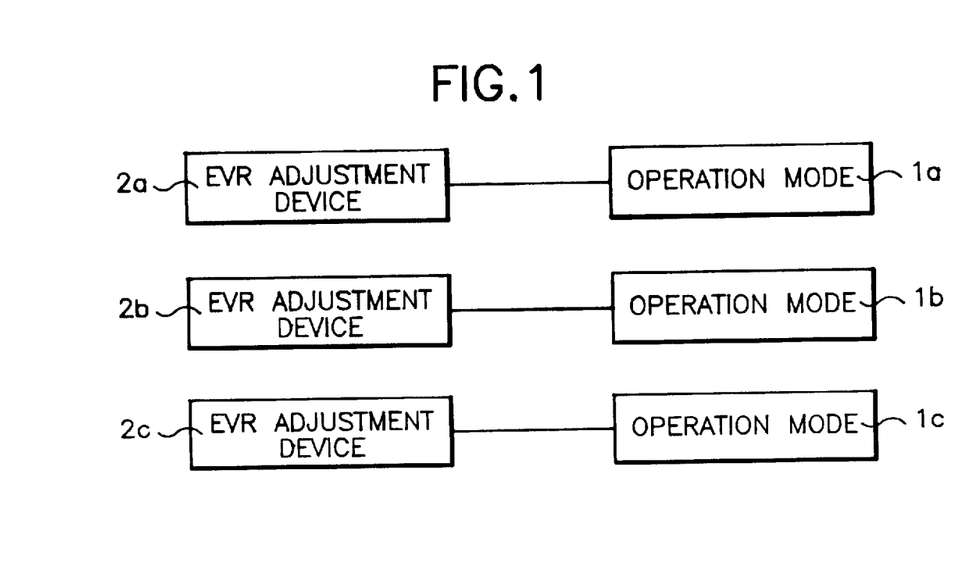
FIG. 1 is a block diagram showing a conventional EVR adjustment device.

A conventional EVR controller has problems of requiring many parts for EVR adjustment and the consequential increase of production cost because the EVR adjustment has been carried out, in case the operation modes of many operation mode parts 1a, 1b are 1c and different from each other as shown in FIG. 1, by applying adjustment values from many EVR adjustment 2, 2b and 2c or VR(Volume Register) to the respective operation mode parts 1a, 1b and 1c connected to each of the EVR adjustment 2a, 2b and 2c OR VR.

SUMMARY OF THE INVENTION

Accordingly, the object of this invention is providing a device and method for multi-processing EVR adjustment which can reduce production cost as well as required number of parts by utilizing adjustment/operation modes having an exclusive relation from each other using one EVR adjustment output terminal for adjustment many adjusting objects with multi-processing method.

These and other objects and features of this invention can be achieved by providing a device for multi-processing EVR adjustment device including a plurality of operation mode means having exclusive adjustment conditions from each other, a plurality of switches for controlling the plurality of operation mode means, a control means for adjustment a system according to the operation of the plurality of switches, a adjustment voltage application means for applying required adjustment voltage to the plurality of operation mode means according to the adjustment of the control means, and a memory for storing control data value to be applied to the plurality of operation mode means according to the control of the control means, and by providing method for a multi-processing EVR adjustment including steps of adjustment operation mode selection for selecting one operation mode form the plurality of operation modes having exclusive adjustment condition from each other at a adjustment mode, adjustment finish value storage for storing adjustment finish value after selecting to-be controlled part which is to be-adjusted part which is to be adjusted of the operation mode selected in the adjustmnet operation mode selection step and executing the adjustment, and adjustment finish value application for applying the stored adjustment finish value to the to-be-adjusted part desired to execute and operation mode of the plurality of operation mode having exclusive adjustment conditions from each other if executed in normal mode.

DETAILED DESCRIPTION OF THE INVENTION

Figure 2:
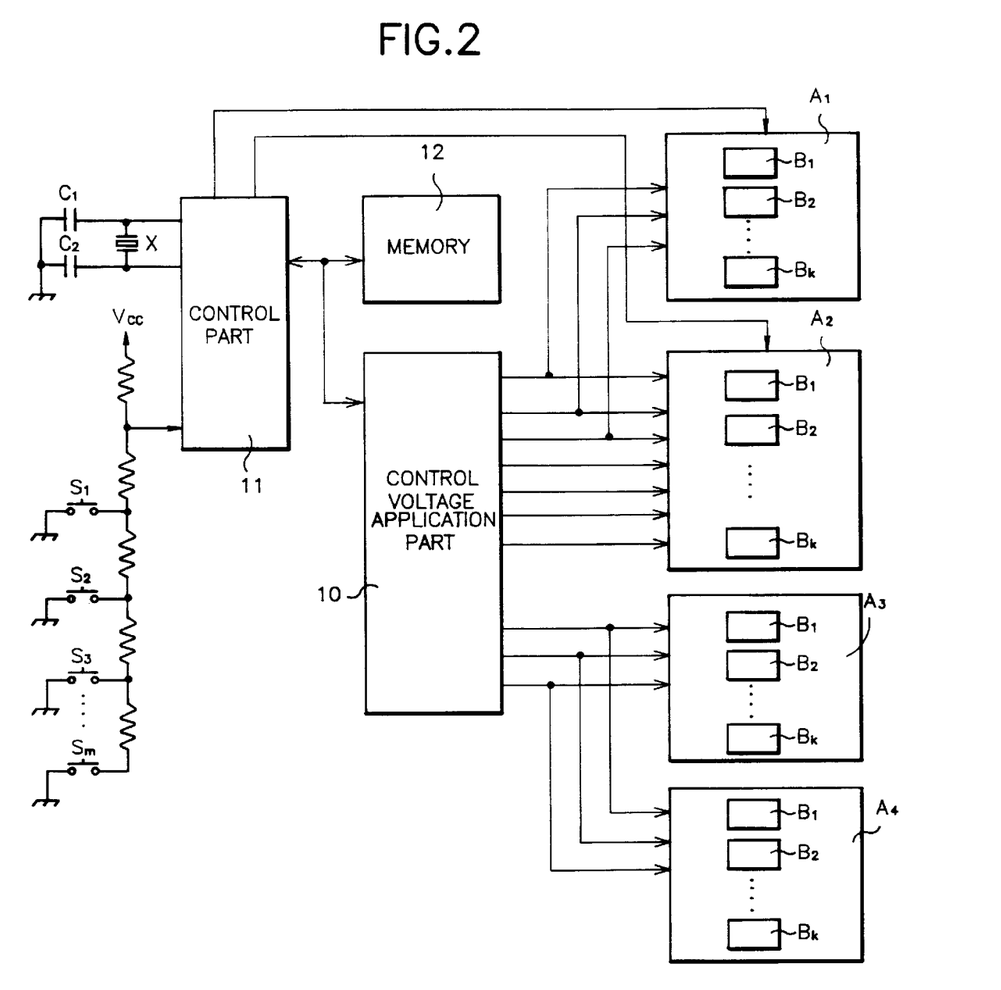
FIG. 2 is a block diagram showing a multi-processing EVR adjustment device in accordance with this invention.

As shown in FIG. 2 a multi-processing EVR adjustment device of this invention includes a plurality of operation mode parts $A_1$ to $A_n$, a plurality of switches $S_1$ to $S_m$, a control part 11, an adjustment voltage application part 10, a memory 12, additional condensers $C_1$ and $C_2$ for generating operation reference frequency, and a quartz-crystal oscillatorx.

The plurality of operation mode parts have exclusive adjustment conditions from each other, and each operation mode part has a plurality of to-be-adjusted parts $B_1$ to $B_k$.

The plurality of switches $S_1$ to $S_m$ are arranged in key matrix and control the plurality of operation mode parts $A_1$ to $A_n$.

The control part 11 has a microcomputer, and controls a system using the data stored in the memory 12 according to the operation of the plurality of switches $S_1$ to $S_m$.

The adjustment voltage application part 10 has a digital/analog converter and applies required adjustment voltage to the plurality of operation mode parts $A_1$ to $A_n$ according to the control of the control part 11.

The memory 12 has EEPROM(Electrically Erasable Programmable Read only Memory) and stores control data value to be applied to the plurality of operation mode parts $A_1$ to $A_n$ according to the control of the control part 11.

Figure 3:
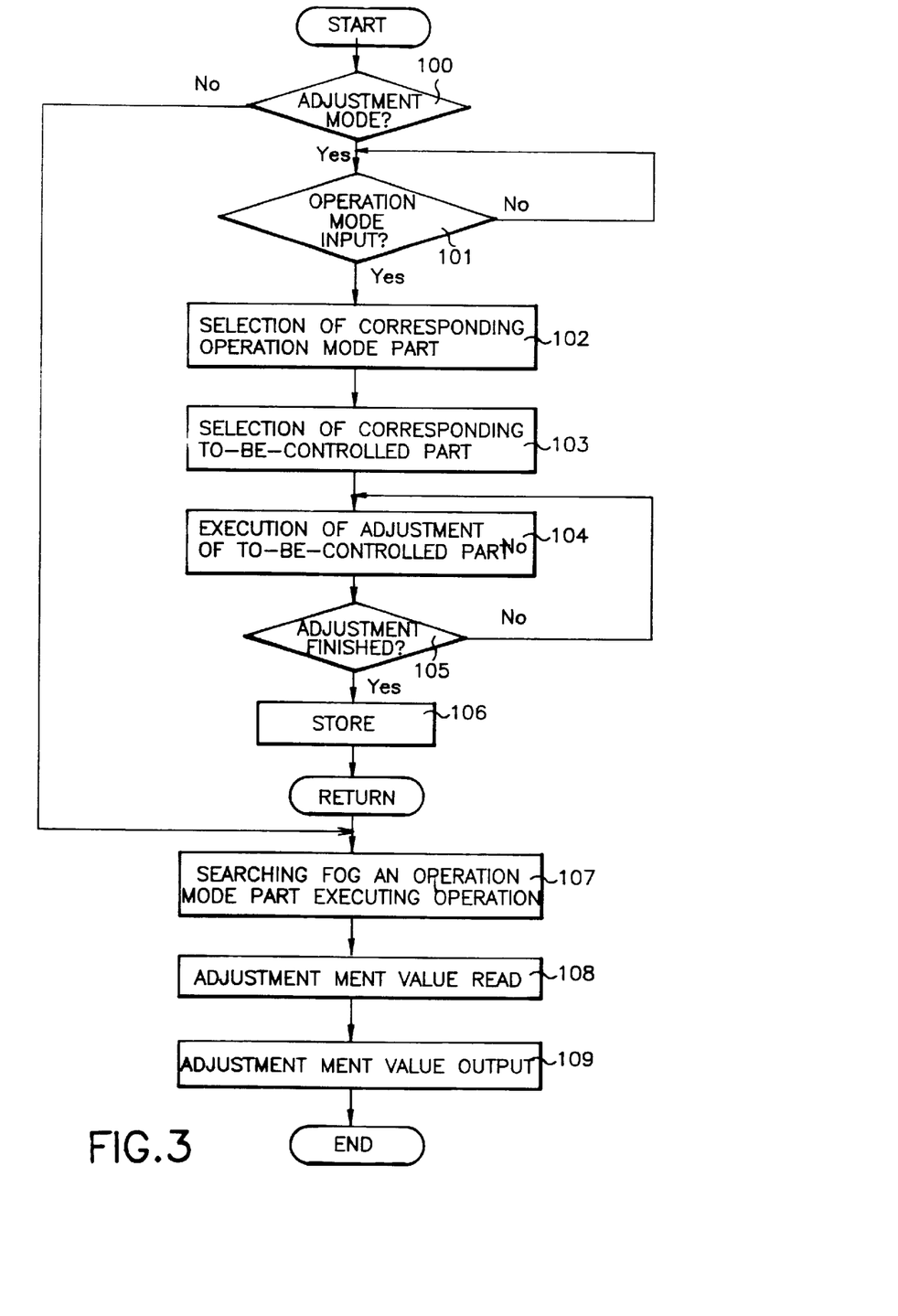
FIG. 3 is flow chart showing a method for a multi-processing EVR adjustment in accordance with this invention.

The operation of a multi-processing EVR adjustment device having the foregoing construction is to be explained hereinafter, referring to FIG. 3.

First, when a user selects any adjustment mode for setting the to-be-adjusted parts $B_1$ to $B_k$ to the adjustment finish value using switches $S_1$ to $S_n$, the control part 11 recognizesit(100), sets the to-be-adjusted parts $B_1$ to $B_k$ to an adjustment mode, and searches whether the user has set an operation mode using the switches $S_1$ to $S_n$(101).

As the result of search, if it is found that the user has selected on operation mode from the plurality of operation modes having exclusive adjustment conditions from each other using switches $S_1$ to $S_m$. the control part 11 selects a operation mode part which will execute corresponding operation mode from the plurality of operation mode parts $A_1$ to $A_n$.102. That is, in a adjustment mode, one operation mode is selected from the plurality of operation modes having exclusive adjustment conditions from each other.

As such, after selecting a to-be-adjusted part which will be executed of an adjustment from the plurality of to-be-adjusted parts within the selected operation mode part selected by a user using switches S to $S_n$(103), the adjustment is executed by applying adjustment voltage from the corresponding operation mode part selected through the control voltage application part 10 to the corresponding to-be-adjusted part(104). In this time, the adjustment voltage application part 10, converting digital signals transmitted from the control part 11 into analog signals, applies direct current voltage to the corresponding to-be-adjusted part.

When adjustment is completed by repeating adjustment following the foregoing process(105), the adjustment value of the corresponding to-be-adjusted part of the corresponding operation mode part the control has been executed, is stored into the memory 12 according to the control of the control part 11(106). That is, after selecting a to-be-adjusted part which will be executed of adjustment of a selected operation mode and executing the adjustment, the adjustment finish value is stored.

By executing the foregoing process repeatedly after storing the adjustment finish value and returning again, executing adjustment of the to-be-adjusted part $B_1$ to $B_k$ within each operation mode part $A_1$ to $A_n$ and storing the adjusted values into the memory 12, the adjustment can be finished.

Under a state that the adjustment values for each of the to-be-adjusted part of each operation mode part has been stored in the memory 12 by completion of adjustment following the foregoing processes, case of normal mode in which normal operations are performed while in service is to be explained hereinafter.

Case of mode that is not a adjustment mode is a normal mode when normal operations are performed while in service, in which normal mode an adjustment finish value stored in a to-be-adjusted part of an operation mode desired to execute operation of the plurality of operation modes having exclusive adjustment conditions from each other, is applied.

That is, under a normal mode selected by a user, an operation mode is selected desired to execute operation for an operation mode part from the plurality of operation mode parts $A_1$ to $A_n$ having exclusive adjustment conditions from each other(107), the adjustment value of each to-be-adjusted part $B_1$ to $B_k$ of the operation mode part desired to execute operation of the adjustment finish values stored in the memory 12, is read in (108), and the read adjustment finish value is transmitted through each output terminal of the adjustment voltage application part 10 after converted into analog value(109).

In this time, since the plurality of operation mode part $A_1$ to $A_n$ have exclusive conditions from each other, even though an adjustment finish value transmitted from the adjustment voltage application part 10 should be applied to an operation mode part which is not desired to execute an operation, the operation mode part which is not desired to execute an operation would not be affected.

An example of application of a multi-processing EVR adjustment of this invention to a VCR is to be explained hereinafter, referring to FIGS. 4, 5, 6 and 7.

Figure 4:
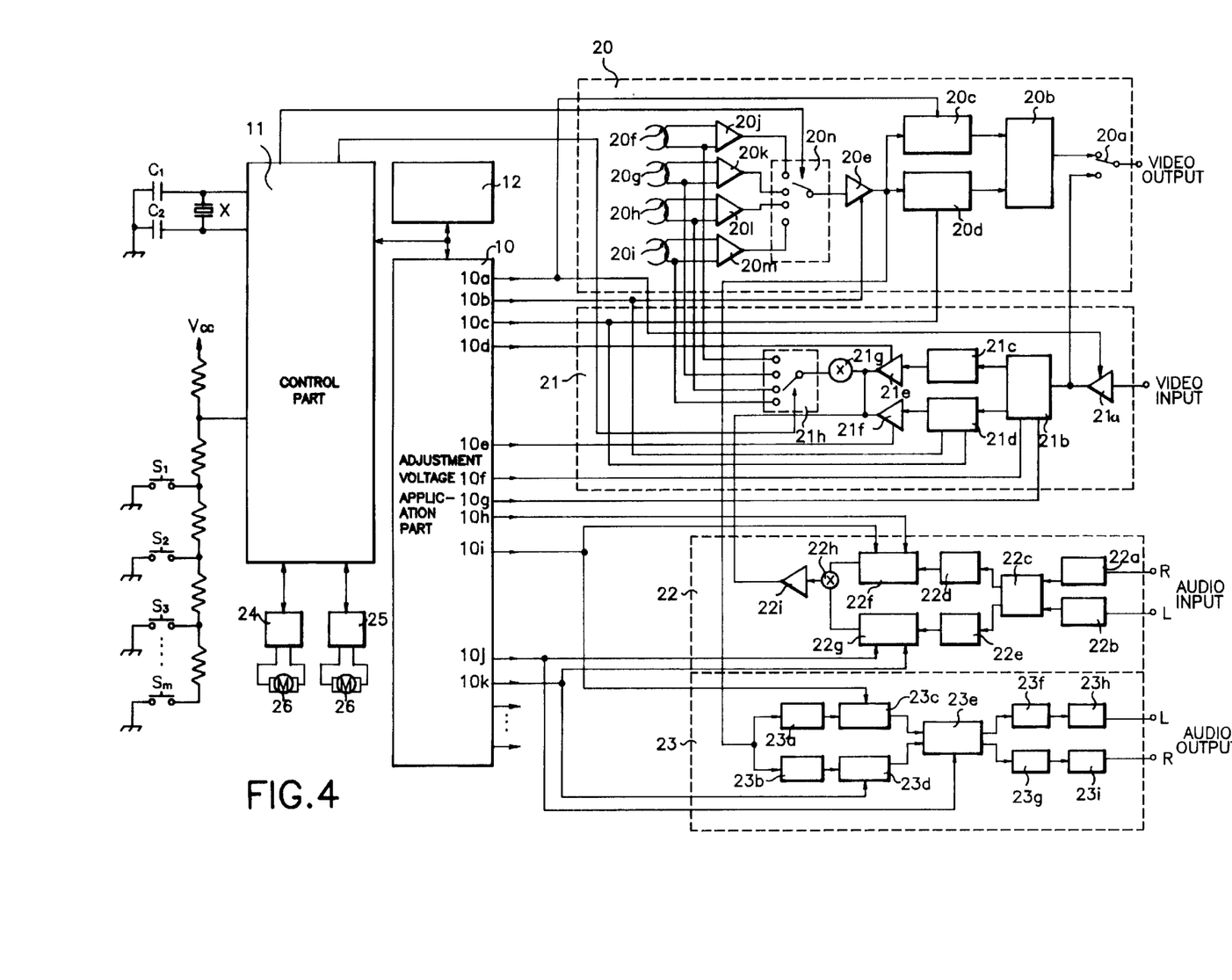
FIG. 4 shows an example of application of the multi-processing EVR adjustmnet device of this invention to a VCR.

A system of recording and reproduction of a VCR, as shown in FIG. 4, has a video signal reproduction part 20, a video signal recording part 21, an audio signal recording part 22, an audio signal reproduction part 23, motor operation parts 24 and 25, and motors 26 and 27.

The video signal reproduction part 20 has a reproduction/recording selection switch 20a, a luminance and chrominance signal matrix part 20b, a chrominance signal demodulation part 20c for demodulating chrominance signals, a luminance signal demodulation part 20d for demodulating luminance signals, a voltage gain amplification part 20e, recording and reproduction heads 20f, 20g, 20h and 20i for recording and reproducing video signals and audio signals, amplification parts 20j, 20k, 20l and 20m for amplifying output of the recording and reproduction heads 20f, 20g, 20h and 20i, and a switch 20n for selecting the heads 20f, 20g, 20h and 20i.

The video signal recording part 21 has an AGC(Auto Gain Controller) 21a for maintaining image input signal at a fixed level, a luminance and chrominance signal separation part 21b, a luminance signal modulation part 21c for modulating luminance signals, a chrominance signal modulation part 21d for modulating chrominance signals, voltage gain amplification parts 21e and 21f connected to the luminance signal and the chrominance signal modulation parts 21c and 21d at output terminals thereof, respectively, a mixing part 21g connected to the amplification parts 21e and 21f, a switch 21h for selecting one of the heads 20f, 20g, 20h and 20i.

The audio signal recording part 22 has AGCS 22a and 22b for receiving audio signals from one side and the other side, respectively and maintaining the audio signal set at a fixed level, audio record matrix part 22C, noise attennators 22d and 22e, FM modulation parts 22f and 22g and a mixing part 22h, and a voltage gain amplification part 22i for transmitting audio signals to amplification part 21g.

The audio signal reproduction part 23 has low pass filters 23a and 23b for filtering output signals of the voltage gain amplification part 20e, FM demodulation part 23c and 23d, an audio reproduction matric part 23e, noise attenuators 23f and 23g for removing noise of the output signals of the audio matrix part 23e and amplifiers 23h and 23i.

In this time, the signal reproduction part 20 and the video signal recording part 21 are under a relation of exclusive adjustment conditions, from each other and the audio signal reproduction part 23 and the audio signal recording part 22 are also under a relation of exclusive adjustment conditions from each other.

Therefore, of the pins of the adjustment voltage application part 10, the first pin 10a is connected to the video signal reproduction part 20 at the chrominance signal demodulation part 20c thereof and the video signal recording part 21 at the AGC 21a thereof, the second pin 10b is connected to the video signal reproduction part 20 at the voltage gain adjustment part 20e thereof and the video signal recording part 21 at the luminance signal modulation part 21d thereof, and the third pin 10c is connected to the video signal reproduction part 20 at the luminance signal demodulation part 20d there of and the video signal recording part 21 at the luminance signal modulation part 21d there of.

Also, of the pins of the adjustment voltage application part 10, the nineth pin 10i is connected to the audio signal recording part 22 at the FM modulation part 22f there of and the audio signal reproduction part 23 at the FM demodulation part 23c there of, the tenth pin 10j is connected to the audio signal recording part 22 at the FM modulation part 22g there of and the audio signal reproduction part 23 at the audio matrix part 23e there of, and the eleventh pin 10k, is connected to the audio signal recording part 22 at the FM modulation part 22g there of and the audio signal reproduction part 23 at the FM demodulation part 23d there of.

Thus, since the video signal reproduction part 20 and the video signal recording part 21 are under a relation of exclusive adjustment conditions from each other, even though the first, second and third pins 10a, 10b and 10c of the adjustment voltage application part 10 are used for the video signal reproduction and recording part 20 and 21 in common, and apply different control data from each other to the video signal reproduction and recording parts 20 and 21, no problems would arise with respect to operation.

That is, since the chrominance signal demodulation part 20c should be applied with 1.2V in reproduction mode, and the AGC 21a should be applied with 2.5V in recording mode, the first pin 10a of the adjustment voltage application part 10 transmits 1.2V in reproduction and 2.5V in recording.

These adjusting values are stored in the memory 12 at the time of an adjustment, and read in and transmitted from the adjustment voltage application part 10 at required values for reproduction or recording according to the control of the control part 11 at the time of normal operation.

And switch control signals of the control part 11 control the switches 20n and 21h directly so that the heads 20f, 20g, 20h and 20i are selected matched to the operation conditions of the appliance, which switch control signals are the control signals for the switches 20n and 21h generated while the motor operation parts 24 and 25 are controlled, and the adjustment voltage application part 10 is applied at the second pin 10b thereof with the high voltage and the low voltage that are made synchronized with the high and the low level of the switch control signals, so that the voltage gain amplification part 20e can be applied with different gains from each other according to the high and low switching offs.

Figure 5:
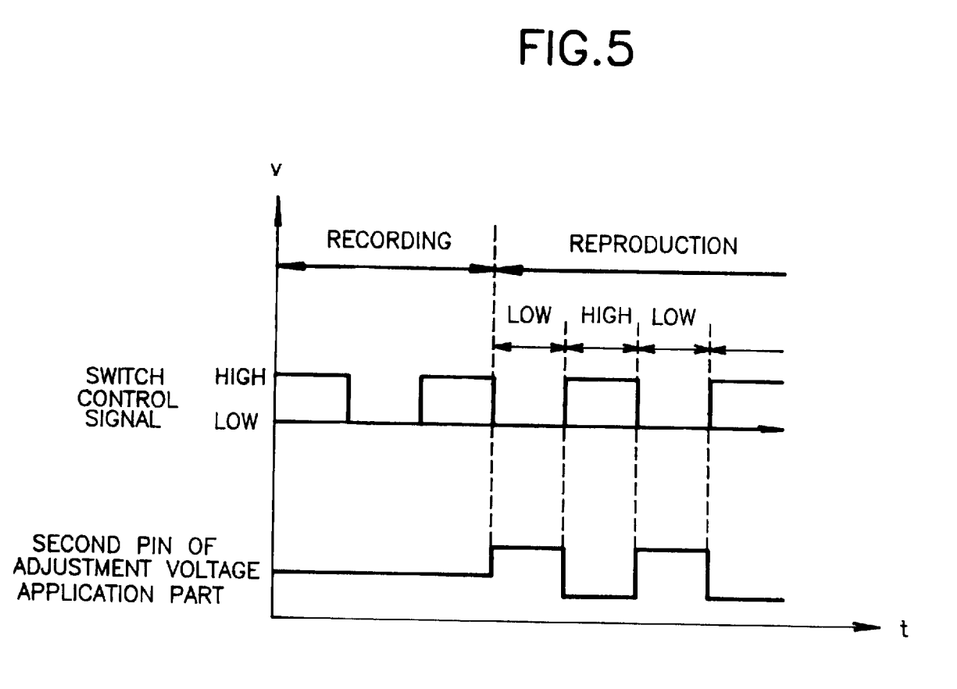
FIG. 5 shows timing of the switch control signal of FIG. 4.

That is, as shown in FIG. 5, at the time of reproduction the second pin 10b of the adjustment voltage application part 10 transmits high level signals in sections where the switch control signals are at low level and low level signals in sections where the switch control signals are at high level, which allows the voltage gain amplification part 20e applied with gains different from each other.

An example of application for a method of a multi-processing EVR adjustment in case a multi-processing EVR adjustment device of this invention is applied as shown in FIG. 4, is to be explained hereinafter, referring to FIGS. 6 and 7.

Figure 6:
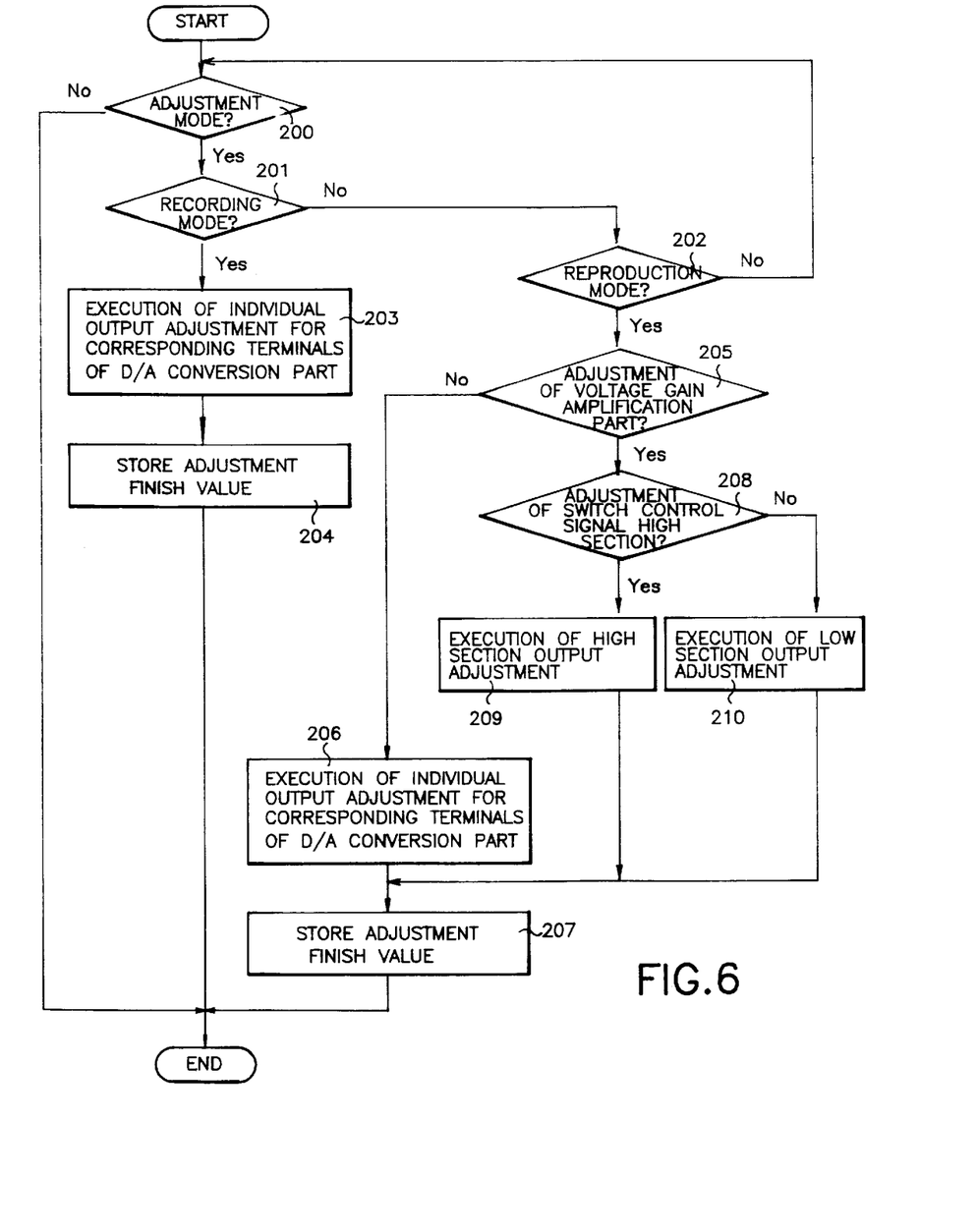
FIGS. 6 and 7 are flow charts showing the multi-processing EVR adjustment method of a VCR according to FIG. 5.
Figure 7:
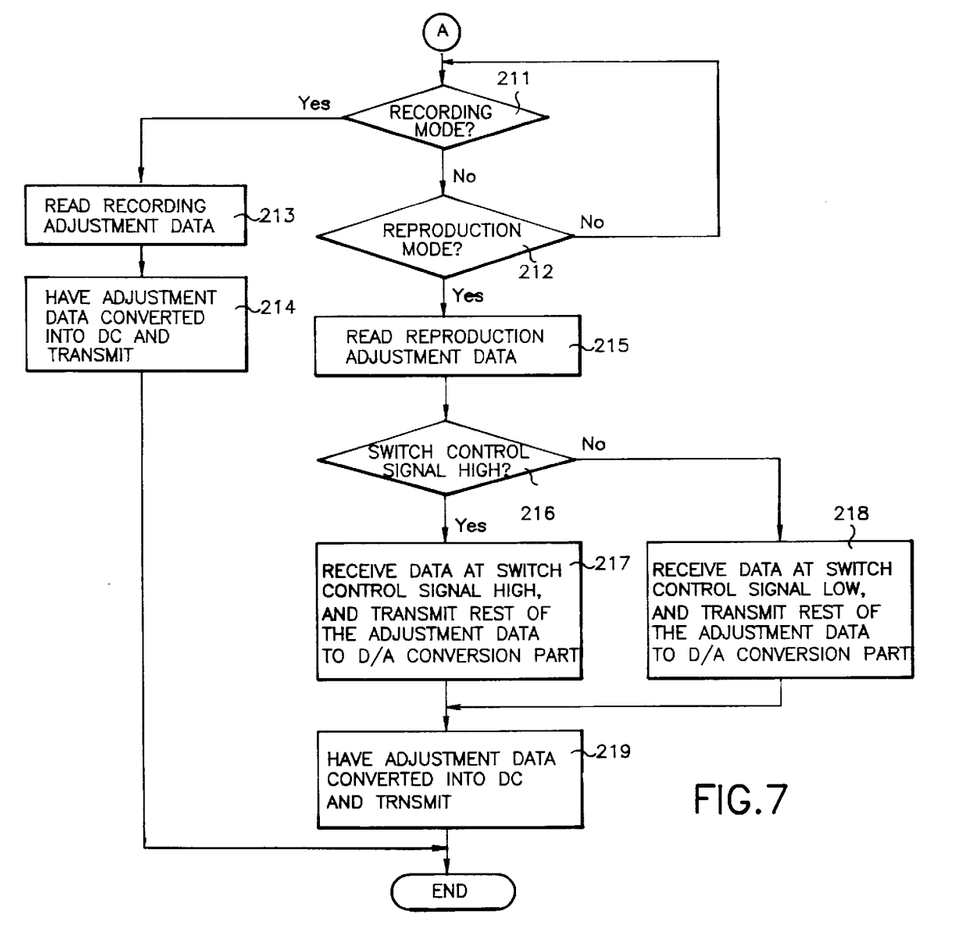

First, case of an adjustment mode is to be explained, referring to FIG. 6.

When it is found to be in an adjustment mode upon checking on mode(200), the mode it is further checked whether it is in a recording mode or a reproduction mode (201 and 202). As the result of the checking, if it is found to be in a recording mode, output adjustment of each terminal 10a to 10k of the adjustment voltage application part 10 is carried out for the video signal recording part 21 and the audio signal recording part 22(203), and the adjustment finish value is stored in the memory 12 when the adjustment is finished(204).

And if it is found to be in a reproduction mode within a adjusting mode as the result of checking, the mode is further checked whether it is the adjusting mode of the voltage gain amplification part 20e of tha video signal reproduction part 20(205). When it is found that the mode is not an adjusting mode of the voltage gain amplification part 20e as the result of the checking, output adjustment of the terminals 10a, 10b, 10c, 10i, 10j and 10k of the adjust voltage application part 10 is carried out for the video signal reproduction part 20 and the audio signal reproduction part 23(206), and the adjustment finish value is stored in the memory 12(207). And if it issi found to be an adjusting mode of the voltage gain amplification part 20e, presence of section adjustment of high level and low level of the switch control signal which controls the switch 20n, is searched(208). If it is found that there is an adjustment of the high level section of the switch control signal, an output adjustment of high level section is carried out on the first pin 10a of the adjustment voltage application part 10(209), and if it is found that there is an adjustment of low level section, an output adjustment of low level section is carried out(21), and the adjustment finish value is stored in the memory 12(207).

And if it is found that it is not in an adjustment mode as the result of the checking, judging that it is in a normal lode, the adjustment value stored in the memory 12 is put to use, which is explained hereinafter, referring to FIG. 7.

The present operation is checked on whether the mode is recording mode or reproduction mode in a normal mode(211 and 212). If it is found to be in a recording mode, the record adjustment data stored in the memory 12 is read in, which is then transmitted to the adjust ment voltage application part 10(213), the value adjusted at the time of recording is converted into direct current in the adjustment voltage application part 10, which current is transmitted to the video signal recording part 21 and audio signal recording part 22(214).

And, if it is found to be reproduction mode within a normal mode, the reproduction adjustment data stored in the memory 12 is read in (215), which is than checked whether the data is on the switch(20n) control signal(216). If it is found to be a switch(20n) control signal as the result of the check, data if the case when the switch 20n control signal is at high level is transmitted to the control part 11, while rest of the reproduction adjustment data is transmitted to the adjustment voltage application part 10(217), and if it is found to be not a switch 20n control signal, data of the case when the switch 20n control signal is at low level is transmitted to the control part 11, while the rest of reproduction adjustment data is transmitted to the adjusted voltage application part 10(218).

The value adjusted at the time of reproduction is converted into direct current in the adjustment voltage application part 10, which is transmitted to the video signal reproduction part 20 and the audio signal reproduction part 23 from the terminals 10a, 10b, 10c, 10i, 10j and 10k individually(219).

Thus, this invention has advantages of, by carrying out multi-processing adjustment utilizing exclusive adjustment conditions, reduction of cost and number or parts, extension of EVR adjustment and improvement of reliability of the EVR adjustment.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the apirit and scope of the appended claims.

What is claimed is:

1. A multiple processing electric volume register adjustment device comprising:

a plurality of operation mode means, wherein each operation mode means has an adjustment condition that is time-wise mutually exclusive from the adjustment condition of another operation mode means, and wherein each operation mode means includes a plurality of to-be-adjusted parts;

a plurality of switches for selecting an operation mode selection signal that represents one operation mode means;

control means for generating control signals using final adjusted values stored in a memory means according to the operation mode selection signal selected by the plurality of switches;

adjustment voltage application means including a plurality of output terminals for applying a plurality of adjustment voltages to the plurality of to-be-adjusted parts of the selected operation mode means in response to the control signal from the control means; and memory means for storing values corresponding to the adjustment voltages from the adjustment voltage application means, wherein the values of the adjustment voltages are associated with the selected operation mode means.

2. A multiple processing electric volume register adjustment device as claim 1, wherein the first operation mode means is an audio or video reproduction system and the second operation mode means is an audio or video recording system.

3. The electric volume register adjustment device as claimed in claim 1,
wherein the adjustment voltage application means has digital/analog converters.

4. The multiple processing electric volume register adjustment device of claim 1, wherein a first operation mode means and a second operation mode means are connected to a common output terminal of the voltage adjustment application means, and the first operation mode means has an adjustment condition that is independent of the adjustment condition of the second operation mode means.

5. The multiple processing electric volume register adjustment device of claim 4, wherein the first operation mode means is an audio or video reproduction system and the second operation mode means is an audio or video recording system.

6. A method for multiple processing electric volume register adjustment comprising steps of:

selecting a first operation mode means that has an adjustment condition that is time-wise mutually exclusive from the adjustment condition of a second operation mode means;

adjusting a plurality of to-be-adjusted parts in the selected operation mode means using final adjusted values stored in a memory means;

storing into a memory a plurality of final adjusted values obtained from the step of adjusting, wherein the plurality of final adjusted values are associated with the selected operation mode means; and applying a plurality of voltages corresponding to the plurality of final adjusted values to the to be adjusted parts, the plurality of voltages being applied through a common output terminal.

7. A method for multiple processing electric volume register adjustment as claimed in claim 6, wherein the step of adjusting a plurality of to-be-adjusted parts comprises:

reading adjusted values stored in memory;

outputting the adjusted values to the to-be-adjusted parts in the plurality of operation mode means;

varying the adjusted values to form modified adjusted values, the adjusted values corresponding to a selected operation mode when the selected operation mode is inputted; and storing the modified adjusted values in said memory when the adjustment is completed.

* * * * *